United States Patent [19]

Feldman, Jr.

[11] Patent Number: 4,508,934

[45] Date of Patent: Apr. 2, 1985

[54] HIGH-CURRENT SWEEP CABLE

[75] Inventor: Karl T. Feldman, Jr., Albuquerque, N. Mex.

[73] Assignee: Gould Inc., Rolling Meadows, Ill.

[21] Appl. No.: 537,031

[22] Filed: Sep. 29, 1983

[51] Int. Cl.³ .......................... H01B 7/12; H01B 7/34; H02G 15/02

[52] U.S. Cl. ................................ 174/101.5; 174/15 C; 174/74 R; 174/113 R; 174/115

[58] Field of Search ................ 174/15 C, 74 R, 101.5, 174/110 F, 110 FC, 113 R, 115

[56] References Cited

U.S. PATENT DOCUMENTS

| | | | |
|---|---|---|---|
| 2,549,777 | 4/1951 | Craig | 174/101.5 |
| 3,322,889 | 5/1967 | Bird et al. | 174/113 R |
| 3,375,324 | 3/1968 | Miller | 174/101.5 |
| 3,652,797 | 3/1972 | Goodman | 174/15 C |
| 3,665,096 | 5/1972 | Madle | 174/110 FC X |
| 4,029,889 | 6/1977 | Mizuochi | 174/110 FC X |
| 4,088,830 | 5/1978 | Wargin et al. | 174/113 R |
| 4,117,447 | 9/1978 | Gould et al. | 174/101.5 X |
| 4,140,114 | 2/1979 | Moore et al. | 174/47 X |
| 4,185,264 | 1/1980 | Chrastina | 174/101.5 X |
| 4,437,097 | 3/1984 | Hudson | 174/101.5 X |

FOREIGN PATENT DOCUMENTS

| | | | |
|---|---|---|---|
| 2033675 | 1/1971 | Fed. Rep. of Germany | 174/113 R |

*Primary Examiner*—R. L. Moses
*Assistant Examiner*—Morris H. Nimmo

[57] ABSTRACT

An improved high electrical current conductive marine sweep cable. The cable includes an elongated flotation core having electrical conductors juxtaposed to the outer surface thereof with thin insulation about each of the conductors, providing high thermal conductivity therethrough. An outer jacket surrounds the associated insulated conductors and core. Structure is arranged to conduct seawater radially through the jacket for effecting heat transfer between the conductors and the ambient seawater suitable to prevent the temperature increase in the conductors resulting from the desired current flow therethrough from rising above a preselected maximum value preventing degradation of the cable.

18 Claims, 2 Drawing Figures

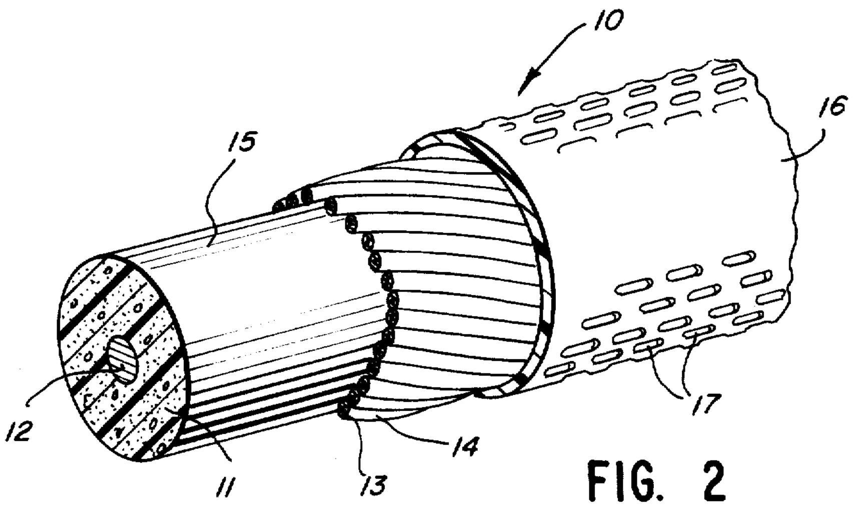
FIG. 2
FIG. 1
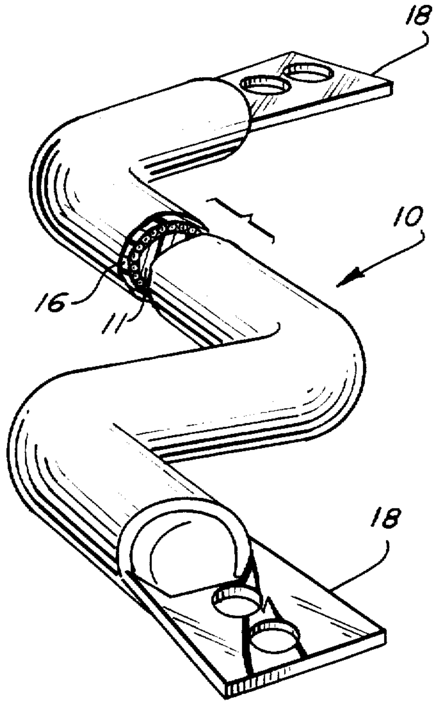

HIGH-CURRENT SWEEP CABLE

TECHNICAL FIELD

This invention relates to marine cables and in particular to marine sweep cables.

BACKGROUND ART

In marine applications such as minesweeping, it is desirable to conduct high amperage electrical currents through a sweep cable being dragged through the water. The $I^2R$ heating effect resulting from such high amperage currents causes degradation of the insulation of the electrical conductors and stands as a barrier to improved minesweeping operation requiring substantially higher currents than those which the present minesweeping cables are capable of handling.

Such sweep cables additionally must be buoyant so as to have a density of less than about 0.95, while resisting tensile stresses. Further, it is necessary to avoid abrasion of the outer surface of the cables as may result from dragging of the cables.

It is further necessary to provide high electrical resistance between the electrical conducting elements and the surrounding seawater.

It is further necessary to minimize the size of the cable and preferably provide such a sweep cable having a diameter of no more than 4 inches.

While increasing the diameter of the individual electrical conductors serves to lower the resistance and, thus, $I^2R$ heating effect, constraints of buoyancy and cable diameter, as discussed above, have made this approach generally ineffective.

Another approach would be to increase the thermal conductivity while decreasing the thickness of the cladding or sheathing of the cable. The abrasion problem, however, places severe constraint on this approach.

Another possible approach is to provide the electrical conductor formed of materials having lower electrical resistance per unit weight. One such candidate material is a light, highly conductive polymer, such as polyacetylene. However, such currently available materials are relatively thermally unstable and present difficulties in mechanical process thereof in the manufacture of the cable.

DISCLOSURE OF INVENTION

The present invention comprehends an improved high electrical current conductive marine sweep cable wherein a thin polymeric insulative coating is provided about the electrical conductor wires to provide high thermal conductance and high electrical resistance. A thicker, more abrasion-resistant jacket is provided about the associated insulated conductors and an internal core to protect the conductors from abrasion.

Means are provided for conducting ambient seawater through the jacket so as to cool the insulated wires by direct thermal transfer with the seawater, thereby permitting substantially increased amperage in the cable without degradation of insulation.

More specifically, the invention comprehends providing such a marine cable including an elongated flotation core defining an outer surface, longitudinally extending electrical conductors juxtaposed to the surface, insulation means for electrically insulating the conductors, and means for preventing abrasion of the insulation comprising a protective outer jacket surrounding the associated insulated conductors and core and means for conducting seawater radially through the jacket for effecting heat transfer between the conductors and the ambient seawater, the cable having an overall capability of heat transfer to the ambient seawater at a preselected maximum electrical current flow through the conductors preselected to prevent the $I^2R$ induced temperature increase in the conductors and insulation from exceeding a preselected value causing degradation of the insulation.

The cable preferably has an overall density of less than about 0.95.

In the illustrated embodiment, the jacket is formed of a porous, synthetic resin material.

The invention comprehends the provision of the jacket in the form of a mesh, and illustratively, may comprise a mesh constricted about the assembled conductive wires and core.

The invention comprehends that the means for conducting seawater into thermal transfer association with the insulated conductors comprise openings in the jacket of sufficient cross-sectional size to permit flow of the ambient seawater therethrough suitably to effect the desired minimization of the temperature increase.

The size of the openings is further correlated with the requirement of abrasion resistance of the outer jacket, and in the illustrated embodiment, the openings have a cross-sectional size of at least approximately 1mm, and no greater than approximately 4mm.

The jacket preferably comprises a thick abrasion-resistant, protective covering.

The insulation of the conductors preferably comprises a thin, electrically insulative covering of the wires providing for high thermal transmission therethrough in transferring heat from the conductors to the ambient seawater. One excellent example of material for use as the outer jacket comprises a high molecular weight polyolefin net.

The invention broadly comprehends the separation of the means for effecting electrical insulation of the conductors and the means for effecting abrasion resistance of the cable into separate structural components preselected for maximum thermal transfer efficiency and abrasion resistance of the cable.

Thus, the improved cable structure of the present invention is extremely simple and economical of construction while yet providing substantial increase in the electrical current capabilities thereof within the parameters established for uses such as marine sweep cable uses.

BRIEF DESCRIPTION OF THE DRAWING

Other features and advantages of the invention will be apparent from the following description taken in connection with the drawing wherein:

FIG. 1 is a broken perspective view of a sweep cable embodying the invention; and FIG. 2 is a fragmentary perspective view thereof.

BEST MODE FOR CARRYING OUT OF THE INVENTION

In the illustrative embodiment of the invention as disclosed in the drawing, a cable generally designated 10 is shown to comprise a high electrical current conductive marine cable having end terminals 18 advantageously adapted for use such as in minesweeping and the like.

The cable preferably comprises a buoyant cable having an overall density of less than 1, and preferably less than 0.95. For use in minesweeping applications, the cable preferably has an outside diameter of no greater than approximately 4 inches.

The cable preferably is arranged to carry maximum current in ambient seawater at temperatures up to approximately 85° F., while remaining flexible under temperatures as low as approximately −37° C., so as to permit reeling of the cable onto conventional minesweeper drums of 72" diameter. The cable preferably has a minimum breaking tension of at least 15,000 lbs., the capability of withstanding, without damage, 3,000 lbs. of compressional force between two flat plates 6 inches in length placed at diametrically opposite sides thereof.

As shown in the drawing, cable 10 includes an inner flotation core 11 which may be provided with an axial tensile member 12 illustratively comprising a steel or nylon cable providing desired longitudinal strength of the cable.

Electrical conductors 13 provided with individual insulation sheaths 14 are spirally wrapped about the outer surface 15 of core 11, and an outer jacket 16 is provided about the assembled core and insulated conductors. Conventional terminal lugs 18 are provided at opposite ends of the cable in electrically connected association with the conductors.

Core 11 is formed of a suitable lightweight material, such as synthetic resin foam. In the illustrated embodiment, the outer surface portion 15 is resistant to degradation by subjection to seawater. Such resistance may be obtained by suitable selection of the foam core material or by suitable treatment of the outer portion thereof in a conventional manner as well-known to those skilled in the art.

The invention comprehends that the insulation 14 comprise a thin polymeric coating about the individual wire conductors 13 so as to provide high thermal conductance therethrough. The insulation is preselected to have high electrical resistance and excellent examples of such insulation material are polyolefin and polytetrafluorethylene.

As indicated briefly above, the invention comprehends the provision in jacket 16 of means for conducting ambient seawater radially therethrough for effecting heat transfer between the electrical conductors and the ambient seawater so as to maintain the temperature rise of the conductors and insulation resulting from the $I^2R$ losses at a preselected low value for preventing damage to the insulation and maintain long life of the cable. Illustratively, where the insulation comprises polyolefin or polytetrafluoroethylene synthetic resin, it has been found desirable to provide sufficient heat transfer from the electrical conductors to the ambient seawater to maintain a temperature differential of no greater than approximately 50° F.

The invention comprehends the provision of the seawater conducting means in the form of openings 17 through the jacket of sufficiently small size so as to permit maintained abrasion resistance characteristics of the jacket, while yet of sufficiently large size to permit free flow of the ambient seawater therethrough to provide effective cooling of the electrical conductors and the desired maintenance of the temperature increase therein below the preselected desired differential temperature. In the illustrated embodiment, the openings through the jacket preferably have a cross-sectional size in the range of approximately 1 to 4mm.

The openings 17 are uniformly distributed in the jacket, as illustrated in the drawing, so as to provide uniform heat transfer throughout the length of the cable.

In the illustrated embodiment, the jacket comprises a thick sheath provided with perforations forming the openings 17. Alternatively, the illustrated cable 10 jacket 16 may comprise a net or mesh of synthetic resins fibers, such as Vexar®, manufactured by E. I. duPont deNemours & Co., comprising High molecular weight polyolefin fibers. Further alternatively, the jacket, or net, 16 may be formed of nylon or other suitable polyamide synthetic resin.

Industrial Applicability

As indicated above, the cable 10 is advantageously adapted for high-current marine cable use, such as minesweeping use.

The electrical conductors may comprise conventional aluminum conductors as a result of the improved heat transfer therefrom to the ambient seawater and thereby minimizing the $I^2R$ temperature rise caused by the high-current flow therethrough. Thus, the cable is advantagely adapted for carrying current substantially higher than the currents which the present known minesweeping cable of this type are capable of carrying.

It has been found that notwithstanding an increase in the surface roughness of the cable, such a cable having an arbitrary length of 450 feet moving through the seawater at the conventional minesweeping speed has no substantial increase in drag force required.

The cable has a dielectric strength of approximately 2500 volts at 60 Hz-rms, with an insulation resistance of greater than 1 megohm with 500V dc applied for one minute thereacross.

Thus, the cable is capable of meeting all conventional requirements for minesweeping use, while yet providing a substantial improvement in the current carrying capabilities thereof.

The foregoing disclosure of specfic embodiments is illustrative of the broad inventive concepts comprehended by the invention.

I claim:

1. A high electrical current conductive marine cable comprising:

an elongated flotation core defining an outer surface;

longitudinally extending electrical conductors juxtaposed to said surface;

electrical termination means at the ends of said electrical conductors;

a thin covering of electrical insulation material on each electrical conductor that provides high thermal conductance therethrough;

means for preventing abrasion of said insulation material comprising a protective outer jacket surrounding the associated insulated conductors and core, and means for conducting seawater radially through said jacket for effecting heat transfer between said conductors and the ambient seawater, said cable having an overall capability of heat transfer to the ambient seawater at a preselected maximum electrical current flow through said conductors preselected to prevent the $I^2R$ induced temperature increase in said conductors and insulation material from exceeding a preselected value causing degradation of the insulation material; and said cable having an overall density of less than 1.

2. The marine sweep cable of claim 1 wherein said outer jacket is formed of a synthetic resin.

3. The marine sweep cable of claim 1 wherein said means for conducting seawater through said jacket comprises distributed openings in said jacket.

4. The marine sweep cable of claim 1 wherein said abrasion-preventing means comprises a net.

5. The marine sweep cable of claim 1 wherein said abrasion-preventing means comprises a net formed of a synthetic resin.

6. The marine sweep cable of claim 1 wherein said abrasion-preventing means comprises a net formed of a synthetic polyamide resin.

7. The marine sweep cable of claim 1 wherein said abrasion-preventing means comprises a net formed of a high molecular weight polyolefin synthetic resin.

8. The marine sweep cable of claim 1 wherein said jacket has a thickness substantially greater than the thickness of said covering of insulation material.

9. The marine sweep cable of claim 1 wherein said covering of insulation material is formed of a polyolefin synthetic resin.

10. The marine sweep cable of claim 1 wherein said covering of insulation material is formed of polytetrafluoroethylene synthetic resin.

11. A high electrical current conductive marine sweep cable comprising:

an elongated flotation core defining an outer surface;

longitudinally extending electrical conductors juxtaposed to said surface;

a thin covering of electrical insulation material on each electrical conductor that provides high thermal conductance therethrough;

means for preventing abrasion of said insulation material comprising a porous abrasion-resistant outer jacket surrounding the associated insulated conductors and core, the pore size of said jacket being preselected to conduct seawater radially therethrough at a rate for effecting sufficient heat transfer between said conductors and the ambient seawater, at a preselected maximum electrical current flow through said conductors, to prevent the $I^2R$ induced temperature increase in said conductors and insulation material from exceeding a preselected maximum value; and said cable having an overall density of less than 1.

12. The marine sweep cable of claim 11 wherein the pores of said jacket have a cross-sectional size of at least approximately 1 millimeter.

13. The marine sweep cable of claim 11 wherein the pores of said jacket have a cross-sectional size of 2–4 millimeters.

14. The marine sweep cable of claim 11 wherein said jacket comprises a net.

15. The marine sweep cable of claim 11 wherein said jacket comprises a net constricted about the associated conductors and core.

16. The marine sweep cable of claim 11 wherein said insulation means comprises a synthetic resin substantially undegradable by subjection to seawater.

17. The marine sweep cable of claim 11 wherein said jacket is formed of an electrically insulative material.

18. The marine sweep cable of claim 11 wherein said cable has a diameter of four inches or less.

* * * * *